United States Patent
Jeansonne et al.

(10) Patent No.: US 11,520,662 B2
(45) Date of Patent: Dec. 6, 2022

(54) RECOVERY FROM CORRUPTION

(71) Applicant: Hewlett-Packard Development Company, L.P., Spring, TX (US)

(72) Inventors: Jeffrey Kevin Jeansonne, Spring, TX (US); Valiuddin Ali, Spring, TX (US); Richard Bramley, Mansfield, MA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/052,986

(22) PCT Filed: Feb. 11, 2019

(86) PCT No.: PCT/US2019/017459
§ 371 (c)(1),
(2) Date: Nov. 4, 2020

(87) PCT Pub. No.: WO2020/167283
PCT Pub. Date: Aug. 20, 2020

(65) Prior Publication Data
US 2021/0365320 A1    Nov. 25, 2021

(51) Int. Cl.
G06F 11/14    (2006.01)
G06F 9/4401   (2018.01)
G06F 21/57    (2013.01)

(52) U.S. Cl.
CPC ........ *G06F 11/1417* (2013.01); *G06F 9/4401* (2013.01); *G06F 11/1405* (2013.01); *G06F 21/575* (2013.01); *G06F 2201/805* (2013.01)

(58) Field of Classification Search
CPC ............ G06F 11/1405; G06F 11/1415; G06F 11/1417; G06F 21/572; G06F 21/575; G06F 9/4401; G06F 2201/805
See application file for complete search history.

(56) References Cited

U.S. PATENT DOCUMENTS

| 4,503,535 A | 3/1985 | Budde et al. |
| 5,269,022 A | 12/1993 | Shinjo et al. |
| 5,327,531 A | 7/1994 | Bealkowski et al. |
| 5,432,927 A | 7/1995 | Grote et al. |
| 5,469,573 A | 11/1995 | McGill, III et al. |

(Continued)

FOREIGN PATENT DOCUMENTS

| CN | 1534685 | 10/2004 |
| CN | 1612115 | 5/2005 |

(Continued)

OTHER PUBLICATIONS

"TMS320C31 Embedded Control", Texas Instruments, Feb. 1998, 184 pgs, http://www.ti.com/lit/an/spru083/spru083.pdf.

(Continued)

*Primary Examiner* — Bryce P Bonzo
*Assistant Examiner* — Albert Li
(74) *Attorney, Agent, or Firm* — Trop, Pruner & Hu PC (57) ABSTRACT

In some examples, a device includes a processor, a core hardware logic to execute instructions to perform a task in the device, and a controller separate from the processor. The controller detects corruption of the instructions, and in response to detecting the corruption, load a recovery code to the core hardware logic to trigger recovery of the core hardware logic from the corruption of the instructions.

17 Claims, 4 Drawing Sheets

(56) References Cited

U.S. PATENT DOCUMENTS

| | | |
|---|---|---|
| 5,564,054 A | 10/1996 | Bramnick et al. |
| 5,713,024 A | 1/1998 | Halladay |
| 5,745,669 A | 4/1998 | Hugard et al. |
| 5,778,070 A | 7/1998 | Mattison |
| 5,819,087 A | 10/1998 | Le et al. |
| 5,822,581 A | 10/1998 | Christeson |
| 5,828,888 A | 10/1998 | Kozaki et al. |
| 5,918,047 A | 6/1999 | Leavitt et al. |
| 5,987,605 A | 11/1999 | Hill et al. |
| 6,205,527 B1 | 3/2001 | Goshey et al. |
| 6,223,336 B1 | 4/2001 | Tojima |
| 6,275,930 B1 | 8/2001 | Bonamico |
| 6,539,473 B1 | 3/2003 | Hubacher et al. |
| 6,594,785 B1 | 7/2003 | Gilbertson et al. |
| 6,651,188 B2 | 11/2003 | Harding et al. |
| 6,665,813 B1 | 12/2003 | Forsman et al. |
| 6,711,675 B1 | 3/2004 | Spiegel et al. |
| 6,934,881 B2 | 8/2005 | Gold et al. |
| 7,069,445 B2 | 6/2006 | Cheston et al. |
| 7,100,087 B2 | 8/2006 | Yang et al. |
| 7,136,994 B2 | 11/2006 | Zimmer et al. |
| 7,193,895 B2 | 3/2007 | Jin et al. |
| 7,203,808 B2 | 4/2007 | Rothman et al. |
| 7,340,595 B2 | 3/2008 | Blinick et al. |
| 7,383,431 B2 | 6/2008 | Takamizawa et al. |
| 7,409,539 B2 | 8/2008 | Arnez et al. |
| 7,483,810 B2 | 1/2009 | Jackson et al. |
| 7,613,872 B2 | 11/2009 | Dayan et al. |
| 7,698,698 B2 | 4/2010 | Skan |
| 7,734,945 B1 | 6/2010 | Levidow et al. |
| 7,818,622 B2 | 10/2010 | Burks, III et al. |
| 7,890,726 B1 | 2/2011 | Falik et al. |
| 7,900,091 B2 | 3/2011 | Chou et al. |
| 7,908,470 B1 | 3/2011 | Cavanna |
| 7,930,532 B2 | 4/2011 | Lin et al. |
| 7,930,576 B2 | 4/2011 | Harris et al. |
| 8,006,125 B1 | 8/2011 | Meng et al. |
| 8,082,384 B2 | 12/2011 | Sareen et al. |
| 8,086,841 B2 | 12/2011 | Guo et al. |
| 8,132,253 B2 | 3/2012 | Martinez et al. |
| 8,190,950 B2 | 5/2012 | Chen et al. |
| 8,230,210 B1 | 7/2012 | Polyudov |
| 8,255,988 B2 | 8/2012 | Carpenter |
| 8,316,200 B2 | 11/2012 | Matsuoka et al. |
| 8,332,934 B2 | 12/2012 | Lee et al. |
| 8,341,386 B2 | 12/2012 | Lee et al. |
| 8,392,762 B2 | 3/2013 | Ramegowda et al. |
| 8,429,391 B2 | 4/2013 | Galbo et al. |
| 8,489,922 B2 | 7/2013 | Matthew |
| 8,732,527 B2 | 5/2014 | Tabone et al. |
| 8,793,477 B2 | 7/2014 | Horvath et al. |
| 9,063,836 B2 | 6/2015 | Swanson et al. |
| 9,251,380 B1 | 2/2016 | Au et al. |
| 9,411,688 B1 | 8/2016 | Poolla et al. |
| 9,417,967 B2 | 8/2016 | Huang et al. |
| 9,542,195 B1 | 1/2017 | Astarabadi et al. |
| 9,575,768 B1 | 2/2017 | Kim |
| 9,734,339 B2 | 8/2017 | Jeansonne et al. |
| 9,785,596 B2 | 10/2017 | Hodge et al. |
| 9,852,298 B2 | 12/2017 | Jeansonne et al. |
| 9,880,908 B2 | 1/2018 | Jeansonne et al. |
| 9,990,255 B2 | 6/2018 | Jeansonne et al. |
| 10,089,472 B2 | 10/2018 | Jeansonne et al. |
| 2001/0008011 A1 | 7/2001 | Oba |
| 2002/0002652 A1 | 1/2002 | Takahashi |
| 2002/0078338 A1 | 6/2002 | Lay et al. |
| 2002/0144177 A1 | 10/2002 | Kondo et al. |
| 2003/0079007 A1 | 4/2003 | Merkin |
| 2003/0126511 A1 | 7/2003 | Yang et al. |
| 2003/0212936 A1 | 11/2003 | Neuman et al. |
| 2003/0221114 A1 | 11/2003 | Hino et al. |
| 2004/0025002 A1 | 2/2004 | Cepulis et al. |
| 2004/0030877 A1 | 2/2004 | Frid |
| 2004/0068334 A1 | 4/2004 | Tsai et al. |
| 2004/0076043 A1 | 4/2004 | Boals et al. |
| 2004/0133790 A1 | 7/2004 | Hensley |
| 2004/0153846 A1 | 8/2004 | Lee |
| 2004/0193862 A1 | 9/2004 | Lin |
| 2004/0268079 A1 | 12/2004 | Riedle et al. |
| 2005/0081090 A1 | 4/2005 | Lin |
| 2005/0108564 A1 | 5/2005 | Freeman et al. |
| 2005/0190699 A1 | 9/2005 | Smith et al. |
| 2005/0210180 A1 | 9/2005 | Rothman et al. |
| 2005/0251673 A1 | 11/2005 | Bosley et al. |
| 2005/0273588 A1 | 12/2005 | Ong et al. |
| 2006/0020844 A1 | 1/2006 | Gibbons et al. |
| 2006/0075395 A1 | 4/2006 | Lee et al. |
| 2006/0143431 A1 | 6/2006 | Rothman et al. |
| 2006/0161784 A1 | 7/2006 | Hunter et al. |
| 2006/0168435 A1 | 7/2006 | Svensson et al. |
| 2006/0225067 A1 | 10/2006 | Yang |
| 2006/0236198 A1 | 10/2006 | Lintz et al. |
| 2007/0088943 A1 | 4/2007 | Phelps et al. |
| 2007/0260866 A1 | 11/2007 | Wang et al. |
| 2008/0040596 A1 | 2/2008 | Mai et al. |
| 2008/0066075 A1 | 3/2008 | Nutter et al. |
| 2008/0072030 A1 | 3/2008 | Karpa |
| 2008/0086629 A1 | 4/2008 | Dellow |
| 2008/0086631 A1 | 4/2008 | Chow et al. |
| 2008/0090653 A1 | 4/2008 | Kuehling et al. |
| 2008/0098381 A1 | 4/2008 | Lin |
| 2008/0126779 A1 | 5/2008 | Smith |
| 2008/0126782 A1 | 5/2008 | Dayan et al. |
| 2008/0141016 A1 | 6/2008 | Chang et al. |
| 2008/0155331 A1 | 6/2008 | Rothman et al. |
| 2008/0172558 A1 | 7/2008 | Stakutis et al. |
| 2008/0195750 A1 | 8/2008 | Sadovsky et al. |
| 2008/0209553 A1 | 8/2008 | Lu et al. |
| 2008/0269954 A1 | 10/2008 | Lev et al. |
| 2008/0307134 A1 | 12/2008 | Geissler et al. |
| 2009/0049293 A1 | 2/2009 | Jiang |
| 2009/0063834 A1 | 3/2009 | Huang et al. |
| 2009/0089570 A1 | 4/2009 | Andrianov |
| 2009/0100287 A1 | 4/2009 | Chu et al. |
| 2009/0150598 A1 | 6/2009 | Jung et al. |
| 2009/0150662 A1 | 6/2009 | Desselle et al. |
| 2009/0158020 A1 | 6/2009 | Chen et al. |
| 2009/0158024 A1 | 6/2009 | Hung et al. |
| 2009/0172639 A1 | 7/2009 | Natu et al. |
| 2009/0217373 A1 | 8/2009 | Stillerman et al. |
| 2009/0240934 A1 | 9/2009 | Chou |
| 2009/0248955 A1 | 10/2009 | Tamada |
| 2009/0249113 A1 | 10/2009 | Chou et al. |
| 2009/0271602 A1 | 10/2009 | Burks, III et al. |
| 2009/0327684 A1 | 12/2009 | Zimmer et al. |
| 2010/0017589 A1 | 1/2010 | Reed et al. |
| 2010/0064127 A1 | 3/2010 | Lee |
| 2010/0070800 A1 | 3/2010 | Hanna |
| 2010/0082960 A1 | 4/2010 | Grobman et al. |
| 2010/0082968 A1 | 4/2010 | Beverly |
| 2010/0100720 A1 | 4/2010 | Wu et al. |
| 2010/0115187 A1 | 5/2010 | Wu et al. |
| 2010/0115256 A1 | 5/2010 | Challener et al. |
| 2010/0169551 A1 | 7/2010 | Yano et al. |
| 2010/0235617 A1 | 9/2010 | Chen |
| 2010/0299493 A1 | 11/2010 | McGee, III |
| 2011/0029742 A1 | 2/2011 | Grube et al. |
| 2011/0060899 A1 | 3/2011 | Hsieh et al. |
| 2011/0066837 A1 | 3/2011 | Lee et al. |
| 2011/0087872 A1 | 4/2011 | Shah et al. |
| 2011/0093675 A1 | 4/2011 | Lu et al. |
| 2011/0093741 A1 | 4/2011 | Liang et al. |
| 2012/0011393 A1 | 1/2012 | Roberts et al. |
| 2012/0072710 A1 | 3/2012 | Gupta et al. |
| 2012/0072897 A1 | 3/2012 | Selvam |
| 2012/0079174 A1 | 3/2012 | Nellans et al. |
| 2012/0210165 A1 | 8/2012 | Lambert et al. |
| 2012/0239920 A1 | 9/2012 | Yang |
| 2012/0297178 A1 | 11/2012 | Peng et al. |
| 2012/0303944 A1 | 11/2012 | Peng et al. |
| 2012/0324150 A1 | 12/2012 | Moshayedi et al. |
| 2013/0013905 A1* | 1/2013 | Held .............. G06F 21/572 713/2 |
| 2013/0047031 A1 | 2/2013 | Tabone et al. |

(56) References Cited

U.S. PATENT DOCUMENTS

| | | |
|---|---|---|
| 2013/0159690 A1 | 6/2013 | Tsukamoto et al. |
| 2013/0232325 A1 | 9/2013 | Jang et al. |
| 2014/0115314 A1 | 4/2014 | Huang et al. |
| 2014/0237223 A1 | 8/2014 | Chudgar et al. |
| 2014/0281455 A1 | 9/2014 | Kochar |
| 2014/0325203 A1 | 10/2014 | Roche et al. |
| 2015/0095632 A1 | 4/2015 | Huang et al. |
| 2015/0242656 A1 | 8/2015 | Dasari et al. |
| 2015/0277930 A1* | 10/2015 | Sarangdhar ............ G06F 21/572 713/2 |
| 2015/0301880 A1 | 10/2015 | Allu et al. |
| 2015/0324588 A1 | 11/2015 | Locke |
| 2015/0378815 A1 | 12/2015 | Goda et al. |
| 2015/0381647 A1 | 12/2015 | Huang et al. |
| 2016/0055069 A1* | 2/2016 | Jeansonne ............ G06F 11/1458 714/15 |
| 2016/0055113 A1 | 2/2016 | Hodge et al. |
| 2016/0055332 A1 | 2/2016 | Jeansonne et al. |
| 2016/0055338 A1 | 2/2016 | Jeansonne et al. |
| 2016/0063255 A1 | 3/2016 | Jeansonne et al. |
| 2016/0211977 A1 | 7/2016 | Kohiyama |
| 2016/0364570 A1 | 12/2016 | Stern |
| 2017/0249002 A1 | 8/2017 | Costa et al. |
| 2018/0089435 A1* | 3/2018 | Zander .................. G06F 21/575 |
| 2018/0225167 A1 | 8/2018 | Bharadwaj et al. |
| 2019/0286436 A1* | 9/2019 | Liu ........................ G06F 8/654 |
| 2020/0104504 A1* | 4/2020 | Chaiken ................ G06F 21/575 |

FOREIGN PATENT DOCUMENTS

| | | |
|---|---|---|
| CN | 1799028 | 7/2006 |
| CN | 1928843 | 3/2007 |
| CN | 100472657 | 3/2009 |
| CN | 101458743 | 6/2009 |
| CN | 101894054 | 11/2010 |
| CN | 101965570 | 2/2011 |
| CN | 102239472 | 11/2011 |
| CN | 102971742 | 3/2013 |
| EP | 2815350 | 9/2018 |
| KR | 20090034104 | 4/2009 |
| KR | 20090060774 | 6/2009 |
| KR | 20100017874 | 2/2010 |
| KR | 101038567 | 6/2011 |
| TW | 480444 | 3/2002 |
| TW | I280487 | 5/2007 |
| TW | 200809489 | 2/2008 |
| TW | 200842567 | 11/2008 |
| TW | 200931312 | 7/2009 |
| TW | 200941344 | 10/2009 |
| TW | 201007465 | 2/2010 |
| TW | 201020785 | 6/2010 |
| TW | 201133342 | 10/2011 |
| WO | WO-201 0135485 | 11/2010 |
| WO | WO-2012148422 | 11/2012 |

OTHER PUBLICATIONS

Hodge et al., International Application No. PCT/US13/37725 entitled Redundant System Boot Code in a Secondary Non-Volatile Memory filed Apr. 23, 2013 (25 pages).

Hoffman, Chris, Intel Management Engine, Explained: The Tiny Computer Inside Your CPU, How-To Geek, Dec. 21, 2017, 10 pages.

HP Sure Start, Technical White Paper, Automatic firmware intrusion detection and repair, Feb. 2018, 14 pages.

Intel, WkiChip, Management Engine (ME), last modified Jul. 23, 2018, 9 pages, https://en.wikichip.org/wiki/intel/management_engine.

International Search Report and Written Opinion received in PCT Application No. PCT/US2013/037729, dated Jan. 22, 2014, 9 pgs.

Jeansonne et al., International Application No. PCT/US13/37724 entitled Recovering From Compromised System Boot Code filed Apr. 23, 2013, 29 pages.

Jeansonne et al., International Application No. PCT/US13/37727 entitled Configuring a System filed Apr. 23, 2013, 35 pages.

Jeansonne et al., International Application No. PCT/US13/37728 entitled Event Data Structure To Store Event Data filed Apr. 23, 2013, 36 pages.

Jeansonne et al., International Application No. PCT/US13/37729 entitled Repairing Compromised System Data in a Non-Volatile Memory filed Apr. 23, 2013, 25 pages.

Jeansonne et al., International Application No. PCT/US 13/37733 entitled Retrieving System Boot Code From a Non-Volatile Memory filed Apr. 23, 2013, 26 pages.

Jeansonne et al., International Application No. PCT/US13/37735 entitled Verifying Controller Code and System Boot Code filed Apr. 23, 2013, 36 pages.

Lee, Matthew, "Embedded Controller Usage in Low Power Embedded Designs an Overview", Sep. 2011, 19 pgs, http://download.intel.com/design/intarch/papers/326133.pdf.

Margaret Rouse, Definition from Whatis.com, NAND flash memory, Apr. 18, 2013, 7 pages.

Margaret Rouse, Definition from Whatis.com, NOR flash memory, Nov. 13, 2017, 8 pages.

Patelay, Wolfgang, "A Single-chip Solution for System-supervisory Functions", Jun. 18, 2010, 44 pgs, http://www.embedded-control-europe.com/digitalissues/ecejun10/files/ecejun10.pdf.

Regenscheid, Andrew, NIST Special Publication 800-193, Platform Firmware Resiliency Guidelines, May 2018, 45 pages.

Regenscheid et al., "BIOS Integrity Measurement Guidelines (Draft)", Dec. 2011, 47 pgs, http://csrc.nist.gov/publications/drafts/800-155/draft-SP800-155_Dec2011.pdf.

Wikipedia, Amd Platform Security Processor, last edited Nov. 7, 2018, 2 pages.

Wikipedia, Flash memory, last edited Jan. 3, 2019, 19 pages.

Wikipedia, Intel Active Management Technology, last edited Oct. 13, 2018, 11 pages.

Wikipedia, Intel Management Engine, last edited Dec. 17, 2018, 8 pages.

Yin et al; Verification-based Multi-backup Firmware Architecture, an Assurance of Trusted Boot Process for the Embedded Systems, 2011 International Joint Conference of IEEE TrustCom, Nov. 16-18, 2011, 1188-1195.

* cited by examiner

RECOVERY FROM CORRUPTION

BACKGROUND

Electronic devices can include various components for performing different tasks. For example, the components can include a processor, a memory, an embedded controller, an input/output (I/O) device, and other components. Various code (in the form of machine-readable instructions including firmware and/or software) are executable on the embedded controller, the processor, and other components.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Machine-readable instructions executable by various components of an electronic device may be corrupted for a number of reasons. For example, an unauthorized entity, such as malware, may modify the instructions or data used by the instructions to cause the instructions to no longer be operational or to operate in an unintended manner. Corruption of instructions can also be due to other causes, including failure to update the instructions with a latest code update, errors introduced by defective hardware or a program, and so forth.

Examples of electronic devices include any or some combination of the following: computers (e.g., desktop computers, notebook computers, tablet computers, server computers, etc.), handheld devices (e.g., smartphones, game appliances, etc.), wearable devices (e.g., smart watches, head-mounted devices, smart eyeglasses, etc.), Internet-of-Things (IoT) devices, controllers in vehicles, storage systems, communication nodes, and so forth.

If the machine-readable instructions (e.g., firmware) of certain components of an electronic device become corrupted, then the electronic device may not be able to boot successfully and thus can become non-operational. For example, an electronic device may include core hardware logic that performs certain functionalities for the electronic device. For example, the core hardware logic can include any or some combination of the following: an input/output (I/O) control logic to manage interaction with I/O components of the electronic device, a display control logic to control display of images at a display device, a memory control logic to manage access of a memory, a storage control logic to manage access of a persistent storage such as a disk-based storage or solid state drive, and so forth.

The core hardware logic of the electronic device can also be referred to as a "chipset" of the electronic device, where the chipset can include one integrated circuit (IC) chip or multiple IC chips, depending on the implementation.

Certain components of the core hardware logic can execute machine-readable instructions, such as firmware and/or software. One such component includes a management engine of the core hardware logic. Examples of management engines include the Management Engine (ME) from Intel, the Secure Processor from Advanced Micro Devices (AMD), and so forth. More generally, the core hardware logic can include a core controller (e.g., the ME or Secure Processor) that performs certain basic tasks in an electronic device to enable operation of the electronic device.

An example of a task that can be performed by firmware executed on the core controller include configuration of settings of a processor, such as configuring a clock of the processor, configuring a voltage of the processor, configuring power management control by the processor, and so forth. In other examples, the firmware executed on the core controller can also provide security for the electronic device (such as by storing an encryption key in a storage), enable remote management of the electronic device (in which an entity that is coupled to the electronic device over a network can manage the electronic device), and so forth.

If the firmware of the core controller becomes corrupted for any reason, then the core controller would not be able to perform its tasks during startup of an electronic device. As a result, the processor of the electronic device would not be configured properly (because the core controller has experienced a fault), and thus the processor may remain non-operational. As a result, boot code of the electronic device cannot start, and the electronic device will not operate.

In accordance with some implementations of the present disclosure, an electronic device includes a controller (e.g., an embedded controller), which is separate from the processor of the electronic device. The embedded controller is able to detect corruption of machine-readable instructions (e.g., firmware) executable by a core hardware logic (such as by a core controller). In response to detecting the corruption of the machine-readable instructions of the core hardware logic, the embedded controller can retrieve a recovery code and load the recovery code to the core hardware logic. The core hardware logic can execute the recovery code to allow the core hardware logic to perform certain basic tasks, including configuring the processor to enable functioning of the processor. Once the functioning of the processor is enabled, a boot code of the electronic device can execute on the processor, and the boot code can perform a full recovery process to recover from the corruption of the machine-readable instructions of the core hardware logic, including retrieving a full recovery image for the core hardware logic.

Figure 1:
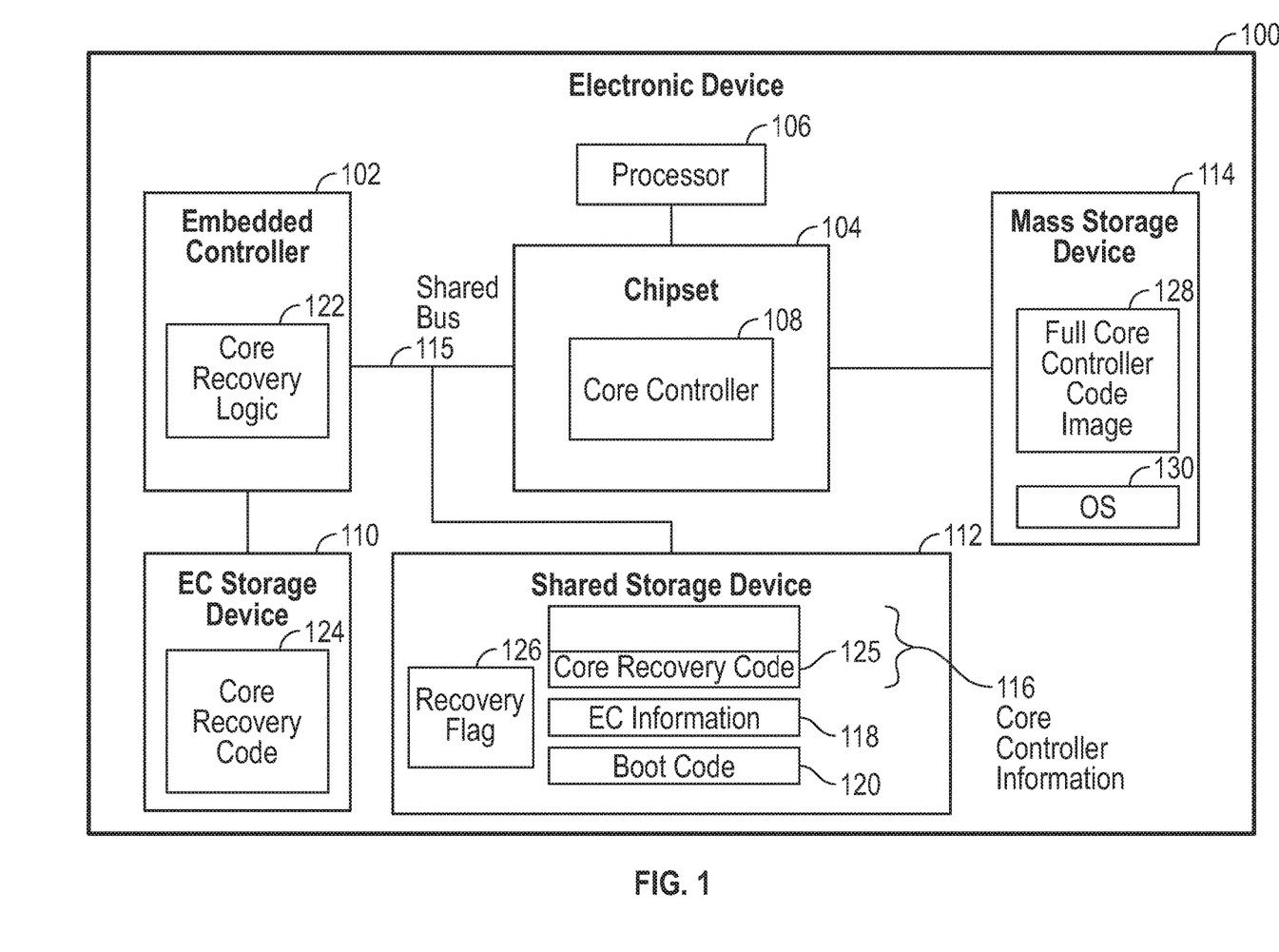
FIG. 1 is a block diagram of an electronic device according to some examples.

FIG. 1 is a block diagram of an example electronic device 100 that includes an embedded controller 102, a chipset 104, and a processor 106. The chipset 104 is considered the core hardware logic of the electronic device 100, in some examples. For example, the chipset 104 can include a Platform Controller Hub (PCH) from Intel, a Fusion Controller Hub from AMD, and so forth.

The chipset 104 includes a core controller 108. The core controller 108 can perform various tasks as noted above. One of the tasks that can be performed by the core controller 108 is configuring settings of the processor 106, to enable the processor 106 to operate during startup of the electronic device 100.

In some examples, the embedded controller 102 can be used to perform specific predefined tasks. In some examples, the tasks of the embedded controller 102 are performed by embedded controller (EC) code (that is part of EC information) 118, in the form of machine-readable instructions such as EC firmware or EC software, executed on the embedded controller 102. In other examples, the tasks of the embedded controller 102 can be performed by a hardware processing circuit of the embedded controller 102. Examples of tasks that can be performed by the embedded controller 102 include any one or some combination of the following: power supply control in the electronic device 100 (for controlling a power supply that supplies power supply voltages to various components in the electronic device 100), charging and control of a battery in the electronic device 100, thermal monitoring (to monitor a temperature in the electronic device 100), fan control (to control a fan in the electronic device 100), and interaction with a user input device (such as performing a scan of a keyboard of the electronic device 100 or interaction with a pointing device such as a mouse, touchpad, touchscreen, and so forth). In other examples, the embedded controller 102 can perform additional or alternative tasks. The embedded controller 102 can be implemented with a microcontroller, an application-specific integrated circuit (ASIC), a programmable gate array (PGA), or any other type of programmable circuit.

The electronic device 100 further includes an embedded controller (EC) storage device 110, a shared storage device 112, and a mass storage device 114. In some examples, the EC storage device 110 is a private storage device for the embedded controller 102. In such examples, the data in the EC storage device 110 is accessible by the embedded controller 102, but not accessible by any other component of the electronic device 100, including the processor 106 and the chipset 104.

The shared storage device 112 is accessible by multiple components, including the embedded controller 102, the chipset 104, and the processor 106. Access of the shared storage device 112 can be performed over a shared bus 115.

The mass storage device 114 is a storage device that has a larger capacity than the shared storage device 112 or the EC storage device 110. Each of the EC storage device 110, the shared storage device 112, and the mass storage device 114 can be implemented using a nonvolatile memory. A nonvolatile memory can include one nonvolatile memory device, or multiple nonvolatile memory devices. Examples of nonvolatile memory devices include a flash memory device, a phase change memory device, a memristor memory device, and so forth. In further examples, a nonvolatile memory can also be implemented using a disk-based storage device. In further examples, the data in the mass storage device 114 may also be accessible by the processor 106 and the embedded controller 102. In such further examples, the embedded controller 102 is able to access the data in the mass storage device 114 even when the processor 106 is non-operational, such as during the initial stages of startup of the electronic device 100, or due to a corruption in the electronic device 100.

The shared storage device 112 can be used to store various different information, including a core controller information 116, the EC information 118, and boot code 120. The core controller information 116 includes core controller code (in the form of machine-readable instructions) and core controller data that is useable by the core controller code. In some examples, the core controller code includes core controller firmware executable by the core controller 108. The EC information 118 includes EC code (in the form of machine-readable instructions) and EC data useable by the EC code. The EC code can include EC firmware executable by the embedded controller 102.

Although FIG. 1 shows the various storage devices 110, 112, and 114 storing respective different pieces of information, it is noted that in other examples, the respective pieces of information can be stored by different storage devices (e.g., just one storage device or more than one storage device).

During startup of the electronic device 100, the core controller 108 is able to retrieve the core controller code (part of the core controller information 116) from the shared storage device 112 over the shared bus 115, for execution on the core controller 108 to perform tasks of the core controller 108. Prior to the loading of the core controller code on the core controller 108, the embedded controller 102 can first verify the integrity of the core controller code and the core controller data.

The embedded controller 102 includes a core recovery logic 122 to perform verification of the core controller information 116. The core recovery logic 122 can be implemented using a portion of the hardware processing circuit of the embedded controller 102, or alternatively, can be implemented as machine-readable instructions executable by the embedded controller 102.

Verifying a piece of information can refer to cryptographically validating that the piece of information has not been changed and/or confirming that the piece of information is from a trusted source. In some examples, a cryptographic-based verification technique can include a Rivest, Shamar, and Adleman (RSA) verification technique that employs cryptographic encryption. The RSA verification technique involves use of a public key and a private key. The public key is known to multiple entities, but the private key is only known to a single entity. Data encrypted with a private key can be decrypted using the corresponding public key. Alternatively, data can be encrypted using the private key, but decrypted using the public key.

For example, the core controller information 116 stored in the shared storage device 112 can be encrypted using a public key or a private key. To verify the integrity of the core controller information 116, the embedded controller 102 can decrypt the encrypted core controller information 116 using the corresponding private key or public key. If decryption is successful, then the core controller information 116 is verified.

In other examples, other cryptographic-based verification techniques can be employed, such as a Secure Hashing Algorithm (SHA), and so forth.

In further examples, to verify the source and integrity of a piece of information, a signature can be stored in association with the piece of information (either part of the piece of information or as metadata associated with the piece of information). In some examples, the verification of the core controller information 116 can be accomplished by decrypting the associated signature using an encryption key accessible by the embedded controller 102. Decrypting the signature produces a respective value (e.g., a hash value) that can be compared with a corresponding calculated value (e.g., hash value) of the core controller information 116. If the foregoing values match, then the integrity and source of the core controller information 116 is verified.

If the core recovery logic 122 is unable to verify the core controller information 116, then that is an indication that the core controller information 116 is corrupted. The core recovery logic 122 can, in response to detection of corruption of the core controller information 116, initiate a recovery process for the core controller 108.

The EC storage device 110 stores a core recovery code 124. Note that the core recovery code 124 can be a copy of a core recovery code 125 that is a portion of the core controller code (in the core controller information 116) stored in the shared storage device 112. At some point during initial operation of the electronic device 100, which can be during initialization at the factory, initialization by a user, etc., the embedded controller 102 can copy the recovery code portion 125 of the core controller code to the EC storage device 110, for storage as the core recovery code 124.

In response to detection of corruption of the core controller information 116, the core recovery logic 122 prevents the core controller code in the shared storage device 112 from being loaded onto the core controller 108 for execution. For example, the core recovery logic 122 can disable the ability of the chipset 104 to access the shared storage device 112 in response to detection of corruption of the core controller information 116.

To trigger recovery from the corruption of the core controller information 116, the core recovery logic 122 retrieves the core recovery code 124 from the EC storage device 110, and replaces the core recovery code 125 in the shared storage device 112 with the core recovery code 124. The replaced core recovery code 125 (as replaced with the core recover code 124) is loaded by the core controller 108 when the core controller 108 is booted. The replaced core recovery code 125 when executed by the core controller 108 causes the core controller 108 to perform various basic tasks, including configuring the settings of the processor 106 so that the processor 106 can function.

Once the processor 106 is configured, the core controller 108 allows the remaining startup process of the electronic device 100 to proceed, including loading of the boot code 120 for execution on the processor 106.

In some examples, the replaced core recovery code 125 when executed by the core controller 108 can set a flag, such as a recovery flag 126 in the shared storage device 112, to indicate that a core controller recovery process is in progress. The core controller recovery process refers to a process of recovering from corruption of instructions executable by the core controller 108.

A "flag" can refer to any information element, in the form of a bit or a combination of bits, that is settable to different values. If the recovery flag 126 is set to a first value, then that indicates that the core controller recovery process is in progress. If the recovery flag is set to a second value different from the first value, that indicates that a normal startup process of the electronic device 100 is in progress.

When the boot code 120 executes on the processor 106, the boot code 120 determines the state of the recovery flag 126. If the recovery flag 126 is set to the first value, then the boot code 120 performs the core controller recovery process. In the core controller recovery process, the boot code 120 retrieves a full core controller code image 128 from the mass storage device 114. The full core controller code image 128 is a known uncorrupted version of core controller code.

The boot code 120 can replace the corrupted core controller information 116 in the shared storage device 112 with the full core controller code image 128. Once replaced, the full core controller code image 128 becomes the core controller information 116 of the electronic device 100, and the core controller code of the core controller information 116 can be executed by the core controller 108 to perform further tasks of the core controller 108.

Subsequently, the boot code 120 can complete the remaining boot process, which includes initializing various hardware components of the electronic device 100, and loading an operating system (OS) 130 for execution on the processor 106.

Figure 2:
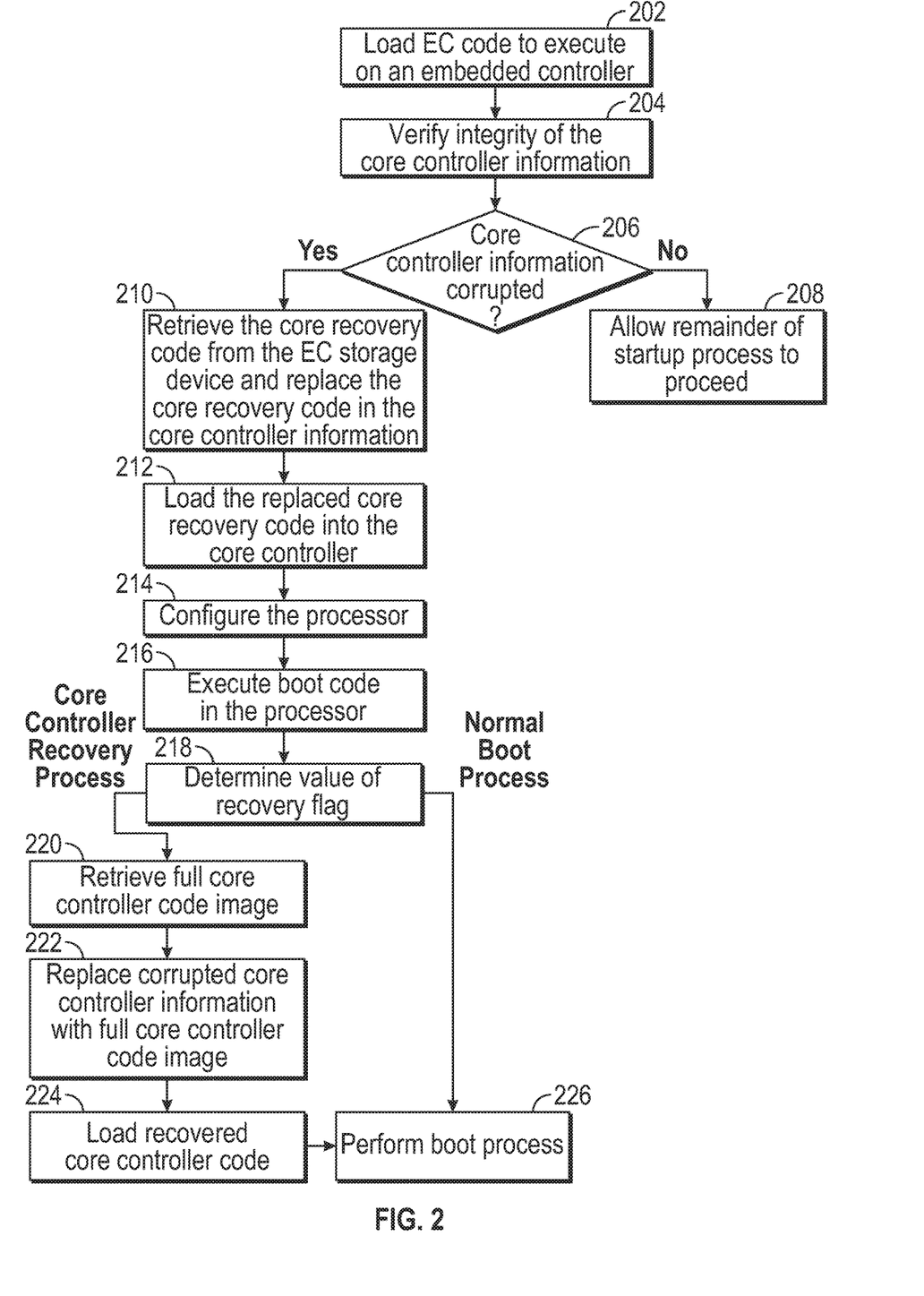
FIG. 2 is a flow diagram of a process according to some examples.

FIG. 2 is a flow diagram of a process that can be performed by the electronic device 100 according to some examples. The process of FIG. 2 can be performed during startup of the electronic device 100, or in response to some other trigger event of the electronic device 100. As part of the startup, the embedded controller 102 can load (at 202) EC code (of the EC code information 118) to execute on the embedded controller 102. The EC code that is executed by the embedded controller 102 can include the core recovery logic 122, in some examples. In some examples, verification of the EC code information 118 can be performed prior to execution of the EC code to confirm that the EC code information 118 has not been corrupted.

The core recovery logic 122 verifies (at 204) the integrity of the core controller information 116 stored in the shared storage device 112. The core recovery logic 122 determines (at 206) whether the core controller information 116 is corrupted based on whether or not the core controller information 116 is successfully verified. If the core controller information 116 is successfully verified, then the core controller information 116 is not corrupted. However, if the core controller information 116 is not successfully verified, then the core controller information 116 is corrupted.

If the core controller information 116 is not corrupted, then the core recovery logic 122 allows (at 208) the remainder of a startup process to continue, including loading of the core controller code onto the core controller 108 for execution by the core controller 108, followed by loading of the boot code 120 for execution on the processor 106 to perform boot tasks.

If the core recovery logic 122 determines (at 206) that the core controller information 116 is corrupted, then the core recovery logic 122 retrieves (at 210) the core recovery code 124 from the EC storage device 110, and replaces the core recovery code 125 (that is part of the core controller information 116) with the retrieved core recover code 124. The replaced core recovery code 125 is loaded (at 212) by the core recovery logic 122

The replaced core recovery code 125 executed by the core controller 108 configures (at 214) the processor 106 to enable functioning of the processor 106. After the processor is enabled, the boot code 120 is executed (at 216) by the processor 106.

The boot code 120 executed on the processor 106 determines (at 218) the value of the recovery flag 126, and if the recovery flag 126 is set to the first value that indicates that the core controller recovery process is in progress, the boot code 120 retrieves (at 220) the full core controller code image 128 from the mass storage device 114. The boot code 120 replaces (at 222) the corrupted core controller information 116 in the shared storage device 112 with the full core controller code image 128. The recovered core controller code is then loaded (at 224) for execution by the full core controller 108, which performs the remaining tasks of the core controller 108, followed by performing (at 226) the boot process by the boot code 120.

If the boot code 120 determines (at 218) that the value of the recovery flag 126 is set to the second value that indicates a normal startup process, the boot process is performed (at 226) by the boot code 120.

Figure 3:
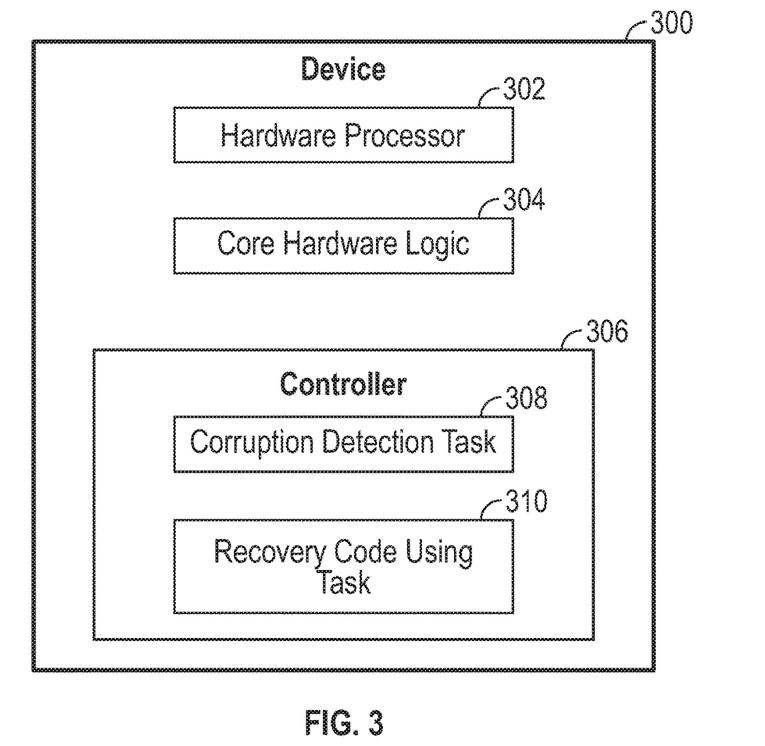
FIG. 3 is a block diagram of a device according to some examples.

FIG. 3 is a block diagram of a device 300 including a hardware processor 302 and a core hardware logic 304 to execute instructions to perform a task in the device 300. A hardware processor can include a microprocessor, a core of a multi-core microprocessor, a microcontroller, a programmable integrated circuit, a programmable gate array, a digital signal processor, or another hardware processing circuit.

A controller 306 (e.g., an embedded controller) separate from the hardware processor 302 is able to perform various tasks. The tasks include an instructions corruption detection task 308 to detect corruption of the instructions, and a recovery code using task 310 to, in response to detecting the corruption, use a recovery code to trigger recovery of the core hardware logic from the corruption of the instructions.

The recovery code is executable on the core hardware logic 304 to enable functioning of the hardware processor 302, by configuring the hardware processor 302. As discussed above, the recovery code can be retrieved from an EC storage device (e.g., 110 in FIG. 1), to replace a corresponding recovery code in a shared storage device (e.g., 112 in FIG. 1). The replaced recovery code is executed by the core hardware logic to configure the hardware processor 302 to enable functioning of the hardware processor 302.

Figure 4:
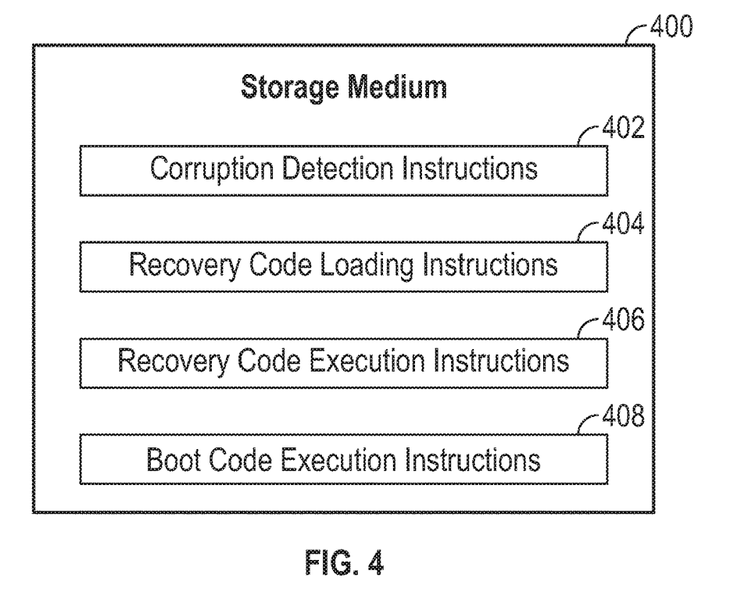
FIG. 4 is a block diagram of a storage medium storing machine-readable instructions according to some examples.

FIG. 4 is a block diagram of a non-transitory machine-readable or computer-readable storage medium 400 storing machine-readable instructions that upon execution cause a controller of a device to perform various tasks. The machine-readable instructions include corruption detection instructions 402 to detect corruption of information comprising data and instructions executable by a core hardware logic in the device. Note that the corruption detected in the information can refer to corruption of the data, or corruption of the instructions, or corruption of both the data and instructions.

The machine-readable instructions further include recovery code loading instructions 404 to, in response to detecting the corruption of the information, retrieve a recovery code from a controller storage accessible by the controller, and replace a recovery code in the information. The machine-readable instructions further include recovery code execution instructions 406 to execute the replaced recovery code by the core hardware logic to configure a processor separate from controller. The machine-readable instructions additionally include boot code execution instructions 408 to, after the configuring of the processor, execute a boot code on the processor.

Figure 5:
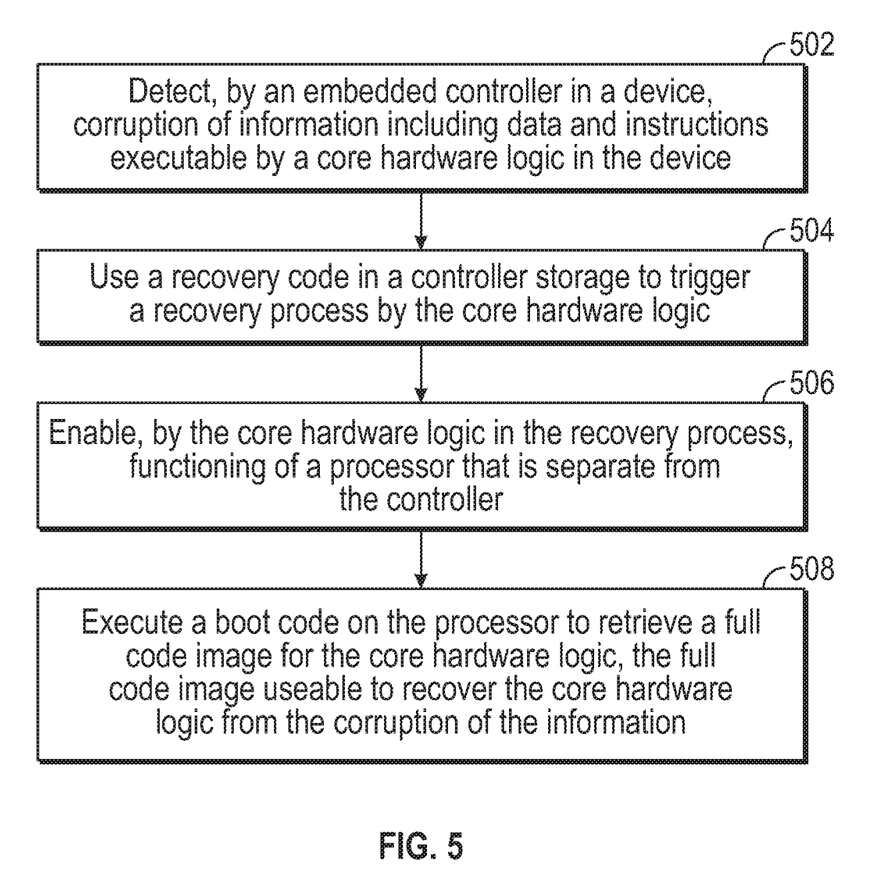
FIG. 5 is a block diagram of a process according to further examples.

FIG. 5 is a flow diagram of a process according to some examples. The process of FIG. 5 includes detecting (at 502), by an embedded controller in a device, corruption of information including data and instructions executable by a core hardware logic in the device. In response to detecting the corruption of the information, the process of FIG. 5 includes uses (at 504) a recovery code in a controller storage to trigger a recovery process by the core hardware logic. Using the recovery code in the controller storage (e.g., the EC storage device 110 in FIG. 1) to trigger the recovery process can include replacing recovery code in a shared storage device (e.g., 112 in FIG. 1) with the recovery code retrieved from the controller storage, and then executing the replaced recovery code by the core hardware logic to perform the recovery process.

The process of FIG. 5 further includes enabling (at 506), by the core hardware logic in the recovery process, functioning of a processor that is separate from the controller.

After enabling of the functioning of the processor by the core hardware logic, the process of FIG. 5 includes executing (at 508) a boot code on the processor to retrieve a full code image for the core hardware logic, the full code image useable to recover the core hardware logic from the corruption of the information.

The storage medium 400 of FIG. 4 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disc (CD) or a digital video disc (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A device comprising:
    a processor;
    a core hardware logic to execute instructions to perform a task in the device;
    a shared storage to store information comprising instructions executable by the core hardware logic;
    a private storage to store a recovery code comprising machine-readable instructions;
    a controller separate from the processor to:
        detect corruption of the instructions in the information stored in the shared storage, and
        in response to detecting the corruption:
            retrieve, with the controller, the recovery code comprising the machine-readable instructions from the private storage accessible by the controller and inaccessible by the processor, and
            replace a recovery code in the information stored in the shared storage with the recovery code retrieved from the private storage,
    wherein the core hardware logic is to execute the recovery code comprising the machine-readable instructions that replaced the recovery code in the information, to enable functioning of the processor and recover from the corruption of the instructions in the information stored in the shared storage;
a further storage to store a full code image for the core hardware logic; and
a boot code executable on the processor after the processor is enabled to retrieve the full code image to replace the instructions in the information in the shared storage using the full code image.

2. The device of claim 1, wherein the private storage is accessible by the controller when the processor is non-operational.

3. The device of claim 1, wherein the recovery code comprising the machine-readable instructions is executable on the core hardware logic to enable the functioning of the processor by configuring a setting of the processor.

4. The device of claim 1, wherein the further storage comprises a mass storage to store the full code image for the core hardware logic.

5. The device of claim 1, wherein the recovery code comprising the machine-readable instructions is executable by the core hardware logic to set a recovery flag to a specified value to indicate that a recovery process of the core hardware logic is in progress.

6. The device of claim 5, wherein the boot code is to replace the instructions in the information in the shared storage using the full code image in response to the boot code detecting that the recovery flag is set to the specified value.

7. The device of claim 1, wherein the instructions in the information in the shared storage comprise firmware executable on the core hardware logic.

8. The device of claim 1, wherein the core hardware logic comprises a core controller to perform configuring of a hardware component of the device.

9. A non-transitory machine-readable storage medium comprising instructions that upon execution cause a device to:
detect, with a controller in the device, corruption of information comprising data and instructions stored in a shared storage and executable by a core hardware logic in the device;
in response to detecting the corruption of the information, retrieve, with the controller, a recovery code comprising machine-readable instructions from a controller storage accessible by the controller and inaccessible by a processor of the device, and replace a recovery code in the information stored in the shared storage with the recovery code retrieved from the controller storage;
execute, by the core hardware logic from the shared storage, the recovery code comprising the machine-readable instructions that replaced the recovery code in the information, to configure the processor separate from controller;
after the configuring of the processor, execute a boot code on the processor;
access, by the boot code, a code image from a storage; and
replace, by the boot code, the information with the code image to recover from the corruption of the information.

10. The non-transitory machine-readable storage medium of claim 9, wherein the controller is an embedded controller, and the controller storage is accessible by the controller when the processor is non-operational.

11. The non-transitory machine-readable storage medium of claim 9, wherein the instructions upon execution cause the device to:
set, by the recovery code comprising the machine-readable instructions executed by the core hardware logic, a recovery flag to a specified value; and
in response to the boot code detecting the recovery flag set to the specified value, initiate a core hardware logic recovery process comprising the accessing and the replacing of the information stored in the shared storage with the code image.

12. A method comprising:
detecting, by an embedded controller in a device, corruption of information comprising data and instructions stored in a shared storage and executable by a core hardware logic in the device;
in response to detecting the corruption of the information, retrieving, by the embedded controller, a recovery code comprising machine-readable instructions from a controller storage accessible by the embedded controller and inaccessible by a processor of the device, and replace a recovery code in the information stored in the shared storage with the recovery code retrieved from the controller storage;
executing, by the core hardware logic from the shared storage, the recovery code comprising the machine-readable instructions that replaced the recovery code in the information, the executed recovery code comprising the machine-readable instructions enabling functioning of the processor that is separate from the embedded controller; and
after enabling of the functioning of the processor by the recovery code comprising the machine-readable instructions executed by the core hardware logic, executing a boot code on the processor to retrieve a full code image for the core hardware logic, the full code image useable to recover the core hardware logic from the corruption of the information.

13. The method of claim 12, wherein the device comprises a mass storage to store the full code image, the method further comprising:
replacing the information in the shared storage with the full code image to recover the core hardware logic responsive to the corruption of the information.

14. The method of claim 12, wherein the controller storage is accessible by the embedded controller when the processor is non-operational.

15. The method of claim 12, wherein the recovery code comprising the machine-readable instructions executed by the core hardware logic enables the functioning of the processor by configuring a setting of the processor.

16. The method of claim 12, comprising:
setting, by the recovery code comprising the machine-readable instructions executed by the core hardware logic, a recovery flag to a specified value to indicate that a recovery process of the core hardware logic is in progress.

17. The method of claim 16, comprising:
in response to the boot code detecting the recovery flag set to the specified value, initiating the recovery process comprising:
accessing, by the boot code, the full code image from a storage; and
replacing, by the boot code, the information stored in the shared storage with the full code image to recover from the corruption of the information.

* * * * *